US006251346B1

(12) United States Patent
Neuman et al.

(10) Patent No.: US 6,251,346 B1
(45) Date of Patent: *Jun. 26, 2001

(54) SOLUTION MINING OF CARBONATE/ BICARBONATE DEPOSITS TO PRODUCE SODA ASH

(75) Inventors: Thomas H. Neuman, Salt Lake City, UT (US); Richard W. Chastain, Lyman, WY (US)

(73) Assignee: Tg Soda Ash, Inc., Granger, WY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/914,990

(22) Filed: Aug. 20, 1997

Related U.S. Application Data

(63) Continuation of application No. 08/651,663, filed on May 21, 1996.

(51) Int. Cl.[7] .................................................... C01D 7/12
(52) U.S. Cl. ..................... 423/206.2; 23/302 T; 299/4; 299/5; 423/421; 423/422
(58) Field of Search ..................... 23/302 T; 423/206.2, 423/421, 422; 299/4, 5

(56) References Cited

U.S. PATENT DOCUMENTS 1,396,841   11/1921   Hirschkind .
1,853,275    4/1932   Houghton et al. .

(List continued on next page.)

FOREIGN PATENT DOCUMENTS

| 15822 | 7/1892 | (GB) . |
| 883202 | 11/1961 | (GB) . |
| 1 495 530 | 12/1977 | (GB) . |
| 2 098 973 | 12/1982 | (GB) . |

OTHER PUBLICATIONS

Butler, J.N., Carbon Dioxide Equilibria and Their Application, Lewis Publishers, Chelsea, MI, pp. 30–39, 221, 1991.
Defensive Publication, *United States Patent Office*, "Process For Producing Crystalline Anhydrous Sodium Carbonate", T928,002, 1 page, Nov. 5, 1974.
Eickmeyer, A.G., "Carbon Dioxide Removal, IV, Catacarb", *Fertilizer Science Technology Series*, pp. 165–169, 1974.
Garrett, D., "Solution Mining", *Natural Soda Ash,* Von Nostrand Reinhold, New York, NY, 1992, pp. 336–355.
Harned et al., "The Thermodynamics of Ionized Water in Sodium Chloride Solutions", vol. 57, pp. 1873–1876, Oct. 1935.
Mahajani et al., "The Stripping of $CO_2$ From Amine–Promoted Potash Solutions at 100° C", *Chemical Engineering Science*, vol. 38, No. 2, pp. 321–327, 1983.

(List continued on next page.)

*Primary Examiner*—Gary P. Straub
(74) *Attorney, Agent, or Firm*—Trask Britt; Patrick C. Baker (57) ABSTRACT

A solution mining process for recovering sodium values from an underground deposit of a sodium bicarbonate containing ore is disclosed. The process involves contacting the ore with an aqueous sodium carbonate-containing solution to produce a dilute brine which is stripped with steam to reduce the bicarbonate content and increase the carbonate content. The dilute carbonate/bicarbonate solution from the stripper is fed to a sodium carbonate decahydrate crystallizer to produce pure sodium carbonate decahydrate crystals and a mother liquor containing less than about 4% sodium bicarbonate.

67 Claims, 2 Drawing Sheets

U.S. PATENT DOCUMENTS

| | | |
|---|---|---|
| 1,911,794 | 5/1933 | Britton . |
| 2,049,249 | 7/1936 | Cunningham . |
| 2,133,455 | 10/1938 | Keene et al. . |
| 2,193,817 | 3/1940 | Houghton . |
| 2,388,009 | 10/1945 | Pike . |
| 2,625,384 | 1/1953 | Pike et al. . |
| 2,639,217 | 5/1953 | Pike . |
| 2,770,524 | 11/1956 | Seaton et al. . |
| 2,780,520 | 2/1957 | Pike . |
| 2,957,822 | 10/1960 | Frint . |
| 2,962,348 | 11/1960 | Seglin et al. . |
| 2,970,037 | 1/1961 | Caldwell et al. . |
| 2,989,369 | 6/1961 | Osborne . |
| 3,028,215 | 4/1962 | Frint . |
| 3,037,849 | 6/1962 | Frint et al. . |
| 3,050,290 | 8/1962 | Caldwell et al. . |
| 3,072,466 | 1/1963 | Bauer et al. . |
| 3,084,026 | 4/1963 | Frint et al. . |
| 3,097,830 | 7/1963 | Love et al. . |
| 3,111,306 | 11/1963 | Love et al. . |
| 3,113,834 | 12/1963 | Beecher et al. . |
| 3,119,655 | 1/1964 | Frint et al. . |
| 3,184,287 | 5/1965 | Gancy . |
| 3,212,848 | 10/1965 | Tasiaux . |
| 3,246,962 | 4/1966 | Miller . |
| 3,264,057 | 8/1966 | Miller . |
| 3,309,171 | 3/1967 | Gancy . |
| 3,328,130 | 6/1967 | Gancy . |
| 3,368,866 | 2/1968 | Seguela . |
| 3,425,795 | 2/1969 | Howard et al. . |
| 3,451,767 | 6/1969 | Saeman . |
| 3,455,647 | 7/1969 | Gloster . |
| 3,459,497 | 8/1969 | Coglaiti, Jr. et al. . |
| 3,498,744 | 3/1970 | Frint et al. . |
| 3,525,434 | 8/1970 | Garrett et al. . |
| 3,528,766 | 9/1970 | Coglaiti, Jr. et al. . |
| 3,655,331 | 4/1972 | Seglin et al. . |
| 3,656,892 | 4/1972 | Bourne et al. . |
| 3,667,902 | 6/1972 | Blumenthal . |
| 3,695,831 | 10/1972 | Goldstein . |
| 3,717,698 | 2/1973 | Ilardi et al. . |
| 3,725,014 | 4/1973 | Poncha et al. . |
| 3,792,902 | 2/1974 | Towell et al. . |
| 3,819,805 | 6/1974 | Graves et al. . |
| 3,836,628 | 9/1974 | Ilardi et al. . |
| 3,838,189 | 9/1974 | Sopchak et al. . |
| 3,869,538 | 3/1975 | Sproul et al. . |
| 3,870,780 | 3/1975 | Guptill . |
| 3,904,733 | 9/1975 | Gancy et al. . |
| 3,927,175 | 12/1975 | Garofano et al. . |
| 3,933,977 | 1/1976 | Ilardi et al. . |
| 3,953,073 | 4/1976 | Kube . |
| 3,956,457 | 5/1976 | Port et al. . |
| 3,966,541 | 6/1976 | Sadan . |
| 3,975,499 | 8/1976 | Walden . |
| 3,981,686 | 9/1976 | Lobunez et al. . |
| 3,984,527 | 10/1976 | Gancy et al. . |
| 3,991,160 | 11/1976 | Gancy et al. . |
| 4,019,872 | 4/1977 | Walden . |
| 4,021,525 | 5/1977 | Poncha . |
| 4,021,526 | 5/1977 | Gancy et al. . |
| 4,021,527 | 5/1977 | Baadsgaard . |
| 4,022,867 | 5/1977 | Gancy et al. . |
| 4,022,868 | 5/1977 | Poncha . |
| 4,032,616 | 6/1977 | Artur et al. . |
| 4,039,617 | 8/1977 | Kuo . |
| 4,039,618 | 8/1977 | Gancy et al. . |
| 4,044,097 | 8/1977 | Gancy et al. . |
| 4,083,939 | 4/1978 | Lobunez et al. . |
| 4,104,033 | 8/1978 | Mahn et al. . |
| 4,148,684 | 4/1979 | Farin . |
| 4,151,261 | 4/1979 | Poncha et al. . |
| 4,158,043 | 6/1979 | Gloster . |
| 4,160,812 | 7/1979 | Conroy et al. . |
| 4,169,812 | 10/1979 | Smith et al. . |
| 4,183,901 | 1/1980 | Ilardi et al. . |
| 4,202,667 | 5/1980 | Conroy et al. . |
| 4,252,781 | 2/1981 | Fujita et al. . |
| 4,260,594 | 4/1981 | Verlaeten et al. . |
| 4,286,967 | 9/1981 | Booth, Jr. et al. . |
| 4,288,419 | 9/1981 | Copenhafer et al. . |
| 4,291,002 | 9/1981 | Arnold et al. . |
| 4,299,799 | 11/1981 | Ilardi et al. . |
| 4,344,650 | 8/1982 | Pinsky et al. . |
| 4,374,102 | 2/1983 | Connelly et al. . |
| 4,401,635 | 8/1983 | Frint . |
| 4,472,280 | 9/1984 | Keeney . |
| 4,498,706 | 2/1985 | Ilardi et al. . |
| 4,519,806 | 5/1985 | Copenhafer et al. . |
| 4,557,910 | 12/1985 | Meadow . |
| 4,564,508 | 1/1986 | Fairweather et al. . |
| 4,584,077 | 4/1986 | Chlanda et al. . |
| 4,652,054 | 3/1987 | Copenhafer et al. . |
| 4,738,836 | 4/1988 | Poncha et al. . |
| 4,743,439 | 5/1988 | Ready . |
| 4,781,899 | 11/1988 | Rauh et al. . |
| 4,814,151 | 3/1989 | Benke . |
| 4,869,882 | 9/1989 | Dome et al. . |
| 5,043,149 | 8/1991 | Frint et al. . |
| 5,192,164 | 3/1993 | Frint et al. . |
| 5,238,664 | 8/1993 | Frint et al. . |
| 5,262,134 | 11/1993 | Frint et al. . |
| 5,270,023 | 12/1993 | May et al. . |
| 5,283,054 | 2/1994 | Copenhafer et al. . |
| 5,290,322 | 3/1994 | Breton et al. . |
| 5,308,455 | 5/1994 | Bourgeois . |
| 5,362,688 | 11/1994 | Porta et al. . |
| 5,395,497 | 3/1995 | Bourgeois . |
| 5,396,863 | 3/1995 | Ninane et al. . |
| 5,609,838 * | 3/1997 | Neuman et al. .................. 423/206.2 |
| 5,618,504 | 4/1997 | Delling et al. . |
| 5,624,647 | 4/1997 | Zolotoochin et al. . |
| 5,766,270 * | 6/1998 | Neuman et al. .................. 23/302 T |

OTHER PUBLICATIONS

Nii et al., "Regeneration of $CO_2$–Loaded Carbonate Solution By Reducing Pressure", *Journal of Chemical Engineering of Japan*, vol. 28, No. 2, pp. 148–153, 1995.

Peiper et al., "Thermodynamics of Aqueous Carbonate Solutions Including Mixtures of Sodium Carbonate, Bicarbonate and Chloride", *J. Chem. Thermodynamics*, 14, pp. 618–638, 1982.

Pohorecki et al., "Desorption with chemical reaction in the system $CO_2$–aqueous solution of potassium carbonate", *The Chemical Engineering Journal*, 46, pp. 1–7, 1991.

Rao, D. Phaneswara, "Design of packed towers for absorption and desorption of carbon dioxide using hot promoted $K_2CO_3$ solution", *Gas Separation& Purification*, vol. 5, pp. 177–180, Sep. 1991.

Sarbar et al., "The activity and osmotic coefficients of aqueous sodium bicarbonate solutions", *Chem. Thermodynamics*, 14, pp. 967–976, 1982.

Savage et al., "Chemical Absorption and Desorption of Carbon Dioxide From Hot Carbonate Solutions", *Chemical Engineering Science*, vol. 35, pp. 1513–1522, 1980.

Taylor, E., "Thermodynamics of Sodium Carbonate in Solution", *Institute of Paper Chemistry*, pp. 653–657, Jul. 1955.

Vanderzee, Cecil, "Thermodynamic properties of solutions of a hydrolyzing electrolyte: relative partial molar enthalpies and heat capacities, solvent activities, osmotic coefficients, and solute activity coefficients of aqueous sodium carbonate", *J. Chem. thermodynamics,* 14, pp. 1051–1067, 1982.

Yakovlev et al., "Constant of the Second Stage of Dissociation of Carbonic Acid in Concentrated $Na_2SO_4$ Solutions", *Zh. Prikl. Khim*(Leningrad), vol. 62, No. 6, pp. 1276–1277, 1989.

ZA 87–9599 871222 South African Patent (Abstract Only: Chemical Abstract No. 110:176149), No Date.

* cited by examiner

SOLUTION MINING OF CARBONATE/ BICARBONATE DEPOSITS TO PRODUCE SODA ASH

This is a continuation of application Ser. No. 08/651,663, filed May 21, 1996, pending.

BACKGROUND OF THE INVENTION

1. Field of the Invention

The present invention relates to a process for recovering sodium carbonate or other sodium based chemicals from solutions containing sodium bicarbonate and especially sodium bicarbonate solutions obtained from solution mining trona deposits.

2. State of the Art

Sodium carbonate (soda ash) is approximately the eleventh highest volume chemical produced in the United States. It is used in the manufacture of glass, chemicals, soaps and detergents, and aluminum. It is also used in textile processing, petroleum refining, and water treatment.

For many years, sodium carbonate was produced by the Solvay process in which carbon dioxide was dissolved in water containing ammonia ($NH_3$) and salt (NaCl) to precipitate sodium bicarbonate which was then separated by filtration and heated to form sodium carbonate. Because of high energy costs and problems with disposing of chloride-containing waste streams generated by the Solvay process, it has been abandoned in the United States in favor of obtaining sodium carbonate from naturally occurring trona deposits. Trona deposits are located in Utah, California, and Wyoming. Green River, Wyo. contains the largest known trona deposits in the United States and is actively mined by five companies.

Crude trona ("trona ore") consists primarily (80–95 percent) of sodium sesquicarbonate ($Na_2CO_3.NaHCO_3.2H_2O$) and in lesser amounts, sodium chloride (NaCl), sodium sulfate ($Na_2SO_4$), organic matter, and insolubles such as clay and shales. In Wyoming, these deposits are located in 25 separate identified beds or zones ranging from 800 to 2800 feet below the earth's surface and are typically extracted by conventional mining techniques such as the room and pillar and longwall methods. The cost of these conventional mining methods is high, representing as much as 35 percent of the production costs for soda ash. Furthermore, recovering trona by these methods becomes more difficult as the best, most thickly bedded trona deposits are depleted. As a result, recovery of carbonate values from trona has fallen in some cases by as much as 5 to 7 percent. Development of new reserves is expensive, requiring a capital investment of as much as $100 to 150 million in 1995 dollars to sink new mining shafts and to install related equipment.

As its chemical composition indicates, trona ore requires processing in order to recover the sodium carbonate. Most of the sodium carbonate from the Green River deposits is produced from the conventionally mined trona ore via the "monohydrate" process. The "monohydrate" process involves crushing and screening the bulk trona ore which, as noted above, contains both sodium carbonate ($Na_2CO_3$) and sodium bicarbonate ($NaHCO_3$) as well as impurities such as silicates and organic matter. After the trona ore is screened, it is calcined (i.e., heated) at temperatures greater than 150° C. to convert sodium bicarbonate to sodium carbonate. The crude soda ash is dissolved in a recycled liquor which is then clarified and filtered to remove the insoluble solids. The liquor is sometimes carbon treated to remove dissolved organic matter which may cause foaming and color problems in the final product, and is again filtered to remove entrained carbon before going to a monohydrate crystallizer unit, a high temperature evaporator system generally having one or more effects (evaporators), where sodium carbonate monohydrate is crystallized. The resulting slurry is centrifuged, and the separated monohydrate crystals are sent to dryers to produce soda ash. The soluble impurities are recycled with the centrate to the crystallizer where they are further concentrated. To maintain final product quality, it eventually becomes necessary to remove the impurities with a crystallizer purge stream.

The production of sodium carbonate using the combination of conventional mining techniques followed by the monohydrate process is becoming more expensive as the higher quality trona deposits become depleted and labor and energy costs increase. As stated above, recovery of sodium carbonate (usually expressed as tons of sodium carbonate produced per ton of trona ore) has fallen as the higher quality, more readily accessible reserves have been mined. Furthermore, the costs of developing new reserves requires substantial capital investment, as much as $100–150 million in 1995 dollars.

Recognizing the economic and physical limitations of conventional underground mining techniques, various solution mining techniques have been proposed. Solution mining allows the recovery of sodium carbonate from trona deposits without the need for sinking costly mining shafts and employing workers in underground mines. In its simplest form, solution mining comprises injecting water (or an aqueous solution) into a deposit of soluble ore, allowing the solution to dissolve as much ore as possible, pumping the solution to the surface, and recovering the dissolved ore from the solution.

For example, a solution mining technique was proposed in U.S. Pat. No. 2,388,009 to Pike on Oct. 30, 1945. Pike discloses a method of producing soda ash from underground trona deposits in Wyoming by injecting a heated brine containing substantially more carbonate than bicarbonate which is unsaturated with respect to the trona, withdrawing the solution from the formation, removing organic matter from the solution with an adsorbent, separating the solution from the adsorbent, crystallizing and recovering sodium sesquicarbonate from the solution, calcining the sesquicarbonate to produce soda ash, and re-injecting the mother liquor from the crystallizing step into the formation.

A second patent to Pike, U.S. Pat. No. 2,625,384, discloses another solution mining method which uses water as a solvent under ambient temperatures to extract trona from existing mined sections of the trona deposits. The subsequent solution is recovered from the mine and heated before dissolving additional dry mined trona in it to form a carbonate liquor having more concentrated values of sodium salts which can subsequently be processed into sodium carbonate.

An additional complicating factor in dissolving trona deposits underground is that sodium carbonate and sodium bicarbonate have different solubilities and dissolving rates in water. These incongruent solubilities of sodium carbonate and sodium bicarbonate can cause bicarbonate "blinding" when employing solution mining techniques. Blinding can slow dissolution and may result in leaving behind significant amounts of reserves in the mine. Blinding occurs as the bicarbonate, which has dissolved in the mining solution tends to redeposit out of the solution onto the exposed surface of the ore as the carbonate saturation in the solution increases, thus "blinding" this surface—and its carbonate values—from further dissolution and recovery. Therefore it is anticipated that long term solution mining of a particular deposit may produce brines with lower sodium carbonate values and higher sodium bicarbonate values than those seen initially. This requires that a process be capable of handling the changing brine grade or that incongruent dissolution must be avoided by some means. "Blinding" is an occurrence which has long been recognized as a problem pertaining to solution mining and is described, for example, in numerous U.S. patents.

U.S. Pat. No. 3,184,287 to Gancy discloses a method for preventing incongruent dissolution and bicarbonate blinding in the mine by using an aqueous solution of an alkali, such as sodium hydroxide having a pH greater than sodium carbonate, as a solvent for solution mining. U.S. Pat. No. 3,953,073 to Kube and U.S. Pat. No. 4,401,635 to Frint also disclose solution mining methods using a solvent containing sodium hydroxide. Unfortunately, alkalis such as sodium hydroxide or lime are expensive and adversely affect the economics of these processes.

The concept of avoiding incongruent dissolution using a brine containing sodium carbonate was discussed by Gancy, supra, and also in U.S. Pat. No. 5,043,149 to Frint, which discloses a specific method to accomplish this. The proposed process disposes of insoluble tailings that remain after uncalcined or calcined trona is dissolved during the process of producing soda ash. The tailings are slurried with water or waste solutions of sodium carbonate or sodium bicarbonate or both and injected into an underground, mined-out cavity. A liquor is removed from the cavity whose concentration of sodium carbonate or sodium bicarbonate or both has been increased and from which sodium-based chemicals may be recovered. Even using these techniques, however, sodium carbonate values can be expected to fall with time and bicarbonate values are likely to be elevated in the brine extracted from the mine.

It is apparent, therefore, that a significant, continuing problem associated with solution mining is the subsequent recovery of the sodium carbonate from the relatively low concentration of carbonate and bicarbonate in the solution mine brine. In recent patents issued to Frint, U.S. Pat. No. 5,262,134, and Copenhafer, U.S. Pat. No. 5,283,054, it is pointed out that past patents such as Kube, No 3,953,073, lack an explanation of how to convert economically these semi-dilute sodium bicarbonate/carbonate mixtures into soda ash. In addition, the solution mining techniques disclosed above produce brines containing sufficient sodium bicarbonate and other impurities to prevent processing into sodium carbonate by the conventional monohydrate process. A major problem experienced is the coprecipitation of sodium sesquicarbonate crystals during sodium carbonate monohydrate crystallization which reduces the quality of the final product.

Several attempts to solve these problems have been made over the years. For example, Miller in U.S. Pat. No. 3,264,057 (1966), describes a process for solution mining of trona. The process directs an aqueous solution to an underground cavity to dissolve trona. The brine removed from underground is split, one part of it going to a steam stripper which converts some bicarbonate to carbonate. The carbonate rich brine from the stripper is recycled to the mine. The other part of the brine stream is directed to an evaporator system (three stages) wherein the brine is concentrated and carbonate crystals are formed by evaporation of water. The final evaporator is operated at 145° C.

Water and some $CO_2$ are driven off in each evaporation stage, but especially in the final stage. Operation of the final evaporator at 145° C., with the concentration of $Na_2CO_3$ increasing and the concentration of $NaHCO_3$ decreasing, results in anhydrous crystals of $Na_2CO_3$ being formed, according to the patent. These crystals are separated by a centrifuge and the wet crystals dried to produce soda ash.

This process requires that enormous quantities of water be circulated through the stripper and mine to keep the alkalinity of the solution mining brine at high levels. The low alkalinity values which would otherwise result would be economically devastating to a process such as Miller's which relies upon evaporation to concentrate the carbonate values and cause crystallization. Also, because many trona deposits are fairly deep, this recirculating load represents an additional economic penalty. This process suffers from other problems, as well, such as the difficulty of producing appropriately sized anhydrous soda ash directly. In addition, the crystallization, centrifugation, and drying steps must all be performed under pressure and at elevated temperatures to avoid the conversion of the anhydrous salt to monohydrate and the extreme processing problems which result from this.

Frint et al., in U.S. Pat. No. 5,262,134, disclose a process for producing soda ash from a solution mine brine containing sodium carbonate and sodium bicarbonate by heating the brine to between 90° C. and 115° C. to evaporate water, convert sodium bicarbonate to sodium carbonate, and to drive off the resulting carbon dioxide therefrom until the concentration of sodium carbonate and sodium bicarbonate in the brine form a solution that will crystallize sodium sesquicarbonate. The sesquicarbonate is then crystallized and separated, and the mother liquor, which is now depleted in bicarbonate, is subjected to a sodium carbonate decahydrate crystallization step. The sesquicarbonate and decahydrate crystals are then processed into various sodium based chemicals including sodium carbonate. This process suffers from the disadvantage of requiring two crystallization steps producing a different crystal species in each step. In addition, it requires the evaporation of large quantities of water early in the process before liquors suitable for feed to more traditional processes can be produced. A small decline in brine grades would adversely affect the economics of such a process because of the tremendous amount of water which would have to be evaporated to produce brines suitable for the later crystalization steps. In addition, the process involves the production of sodium sesquicarbonate, which subsequently yields a significantly less dense soda ash with less wide spread acceptance in the market. Therefore, this process further exemplifies the challenges in handling dilute brines from solution mining processes.

Another process, similar to Frint's which attempts to deal with processing complex bicarbonate and carbonate containing brines was described by Cunningham in U.S. Pat. No. 2,049,249, although in contrast to Frint, it does not deal with brines produced by solution mining. Bulk trona is dissolved to produce a brine which is processed above 17° C. to precipitate sodium bicarbonate. The solid sodium bicarbonate is separated from the mother liquor, which is diluted before it is directed to a cooling crystallizer operated below 17° C. to crystallize sodium carbonate decahydrate. As with the Frint process, U.S. Pat. No. 5,262,134, this process suffers from the disadvantage of requiring two crystallation steps, each producing a different crystal species. The dilution of the mother liquor before decahydrate crystallization is required to avoid forming additional, contaminating, sodium bicarbonate in the decahydrate crystals, but represents an economic penalty. Although this process does not have to deal with incongruent dissolution, blinding and other problems associated with solution mining, it nevertheless produces two products, which means the process can produce only to the level of demand for the less widely used product, sodium bicarbonate.

Copenhafer et al., U.S. Pat. No. 5,283,054, discloses a method for producing soda ash from a brine produced by solution mining. Sodium carbonate and sodium bicarbonate are contained in the dilute brine, which is heated to about 100° C. to about 140° C. to evaporate water, convert sodium bicarbonate to sodium carbonate, and to drive off resulting carbon dioxide. Such concentrated brine having reduced sodium bicarbonate content is then reacted with a sufficient amount of aqueous sodium hydroxide solution to convert essentially all of the remaining sodium bicarbonate in the brine to sodium carbonate. The resulting concentrated sodium carbonate solution having virtually no bicarbonate is further processed to recover soda ash. This solution mining process has been commercially developed and represents the most recent approach to the problems of solution mining of underground trona deposits. Nonetheless, this process still suffers from several drawbacks, including the large requirements of energy to evaporate water to produce concentrated brines. Because the brines are concentrated, caustic is added to take the bicarbonate levels to near zero to avoid sesquicarbonate precipitation in the decahydrate crystallizer. Sodium sesquicarbonate precipitation results in unacceptably high bicarbonate contamination of the decahydrate product, as well as creating severe operating problems related to the poor crystal habit which inevitably results. The high cost of the sodium hydroxide required in the process (even when the caustic is produced on site from carbonate liquors and lime) represents a significant economic penalty. In addition, the operation of a mechanical vapor recompression system for evaporating large quantities of water early in the process adds a significant cost. The process requires a large capital investment for causticizing equipment, evaporators and an MVR.

Solution mining processes generally require either the recirculation of large quantities of pregnant brine or the evaporation of large quantities of water to produce brines with elevated alkalinity values. Many require the production of two products simultaneously and therefore subject the operator to the significant marketing problems associated with this situation. Still other processes, particularly those being commercially developed, require the use of substantial quantities of expensive neutralizing agents such as caustic soda or lime. Unfortunately, these expensive steps tend to offset the costs saved through solution mining. A process which eliminates or reduces the need for these expensive steps, and which produces one product suitable as a feed stock to existing processes producing a variety of products, would finally allow the realization of the advantages expected with solution mining.

Various differences exist between solution mining processes as applied to underground deposits of sodium bicarbonate ores, e.g., trona, and above-ground processes which treat bulk ore which has been conventionally mined. Bulk trona (sodium sesquicarbonate), for example, may be dissolved in an aqueous solvent at high temperatures which are difficult to achieve underground. This allows a much higher concentration to be achieved. After purification, these liquors may be cooled to recrystallize the sesquicarbonate, which is then calcined and converted to soda ash. Alternatively, the bicarbonate content of the mined ore may be decomposed thermally in a calciner, a process which cannot be performed on ore in situ. The calcined ore can then be dissolved in hot liquors to produce an essentially saturated sodium carbonate liquor. In either case, calcination of dry material is required to convert bicarbonate values to carbonate. Therefore, the production of sodium carbonate and other valuable sodium salts by solution mining has generally been more complicated than the production of these same products from conventionally mined ores.

For example, some solution mining processes have included the addition of conventionally mined ore to the mine brine to increase the sodium content of the brine and, therefore, make the brine processable by techniques applied to conventionally mined ore.

A further complicating factor has been the need to eliminate the relatively higher level of soluble impurities associated with solution mine brines. Recently, this has led to the consideration of producing sodium carbonate decahydrate as an intermediate step in the production of sodium salts, including soda ash. Sodium carbonate decahydrate crystals contain ten waters of hydration, which water, unlike entrained or occluded water, is uncontaminated by other sodium salts or other contaminants. Thus, most recently devised processes have focused on the production of sodium carbonate decahydrate. Generally, crystallization is best carried out using concentrated feed streams. This has led to the development of processes (Copenhafer and Frint, for example) involving evaporation to concentrate the brines before they are cooled to produce sodium carbonate decahydrate. In turn, this has created the need to eliminate nearly all of the bicarbonate. Steam stripping has been employed to reduce bicarbonate levels, but cannot economically lower the concentration of bicarbonate in these concentrated brines to a level adequate to avoid bicarbonate related processing problems in the decahydrate crystallizer. The final reduction in bicarbonate levels has been achieved by crystallization of sesquicarbonate in the case of Frint ($\frac{1}{34}$), or by the addition of caustic in the case of Copenhafer. Therefore, solution mining processes proposed in the prior art are complex and expensive. The present invention, in contrast, provides a simplified and less expensive process for handling solution mining brines.

SUMMARY

The present invention solution mines trona or other sodium bicarbonate containing ores to produce a dilute brine which is stripped without the need for evaporation or concentration. The stripped, dilute brine having a reduced bicarbonate content (generally in excess of about 1% but below about 4.5%) is fed directly to a cooling crystallizer, where sodium carbonate decahydrate is crystalled. The sodium carbonate decahydrate crystals are separated from the mother liquor. The crystals can be processed into other sodium containing chemicals such as soda ash, sodium bicarbonate, or caustic soda. The dilute mine brine may be advantageously steam stripped to provide an appropriate concentration of bicarbonate and carbonate values in the feed stream to the decahydrate crystallizer.

The mother liquor, usually with some makeup water, is then returned to the mine. Because the mine brine is not concentrated, less recovery of the carbonate is realized in the decahydrate crystallizer in comparison to recoveries from concentrated brines. However, decreased carbonate recovery is not disadvantageous in the instant process since it is desirable to have significant carbonate values in the aqueous solution returned to the mine to avoid incongruent dissolution of the trona deposit. Therefore, utilizing such a dilute brine does not result in the large disadvantage which one normally associates with feeding a dilute brine to a decahydrate crystallizer.

In addition, it has been discovered that when dilute brines are fed to a decahydrate crystallizer, the brine can contain significantly higher concentrations of bicarbonate than can be tolerated in a crystallizer being fed more concentrated brines. Steam stripping can then be used as the sole means to inexpensively reduce the bicarbonate values to an acceptable level, e.g., above about 1%. If extremely dilute brines are encountered, they can be economically concentrated by using "waste steam" (such as from the third effects of a triple effect monohydrate evaporator train) in a low temperature evaporator. Because the evaporated water in the instant invention is not needed for stripping, evaporation can be conducted at very low temperatures and pressures. This avoids the need to use an expensive vapor recompression device, and allows the use of true waste steam. Therefore, this invention eliminates the significant operating and capital expenses associated with evaporation and chemical neutralization found in the prior art.

It can be seen that the instant invention uniquely recovers sodium values via solution from a trona ore deposit with an aqueous solvent containing sodium carbonate and sodium bicarbonate to produce a brine enriched in both. This brine may be, optionally, concentrated, but only to an extent which causes it's total alkalinity to remain below about 24%, and more preferably below about 20%. This brine is then steam stripped to reduce it's bicarbonate content. As noted in Copenhafer et al., and as is generally understood in the art, steam stripping does not evaporate water; thus, the total alkalinity (TA) concentration of the output stream is the same as the input stream, in contrast to what occurs in an evaporator. Alternatively, the concentration step may be performed after the stripping operation. The stripped brine containing more than 1% bicarbonate, and typically about two to about three percent sodium bicarbonate, is then fed to a cooling crystallizer where sodium carbonate decahydrate is precipitated. The sodium carbonate decahydrate crystals are separated from their mother liquor and processed to form other sodium salts, and the mother liquor is recycled to the mine. In contrast to many other processes, the first crystallizer encountered by the dilute mined brine is a decahydrate crystallizer.

BRIEF DESCRIPTION OF THE DRAWINGS

FIG. 1 is a phase diagram for the sodium carbonate, sodium bicarbonate, and water system. Solubility limits for various species at several temperatures are indicated by the dashed lines. The area below the solid line extending from C to D to E to F to G and back to C, defined as region A, describes the solution compositions for which sodium bicarbonate containing salts (sodium sesquicarbonate, sodium bicarbonate) are not in equilibrium with the solutions at any temperature. In other words, these bicarbonate containing salts will not precipitate from solutions with compositions within region A. In region B (the area above the solid line extending from C to D to E), bicarbonate containing salts (sodium bicarbonate, sodium sesquicarbonate, and others) are in equilibrium with solutions at some temperatures. In other words, these salts may precipitate from solutions in region B at some temperatures.

DETAILED DESCRIPTION OF INVENTION

The instant invention is particularly directed to producing various sodium compounds from dilute brines obtained by the solution mining of underground ore deposits containing substantial quantities of sodium bicarbonate, including ores additionally containing sodium carbonate. A preferred ore is trona, which consists primarily of sodium sesquicarbonate ($Na_2CO_3 \cdot NaHCO_3 \cdot 2H_2O$).

A general overview of the process as applied to an underground trona deposit is as follows:

1) A bicarbonate-containing ore deposit is solution mined with an aqueous solution (solvent) containing sodium carbonate to produce a dilute brine containing sodium bicarbonate and sodium carbonate. The dilute brine from the mine typically contains about 7–18% sodium carbonate and about 3–12% sodium bicarbonate.

2) The dilute brine is stripped with steam to convert some of the bicarbonate to carbonate to yield a dilute, carbonate enriched brine containing significant quantities of bicarbonate; typically, at least one percent.

3) The carbonate enriched brine is cooled to less than about 20° C. (68° F.) to crystallize sodium carbonate decahydrate crystals and to produce a mother liquor which contains significant bicarbonate and carbonate values. The crystallization step is conducted so that the bicarbonate concentration in the mother liquor is preferably below about 4% by weight.

4) The sodium carbonate decahydrate crystals are separated from the mother liquor which typically contains about 5–17% sodium carbonate and up to about 4.5% sodium bicarbonate. The mother liquor, as is, or in conjunction with makeup water, is recycled to the ore deposit.

The sodium carbonate decahydrate crystals may be converted to soda ash or to other sodium compounds by conventional techniques. If soda ash is produced, the decahydrate crystals may be melted then processed via a conventional monohydrate process. Steam from crystallizers in the monohydrate process may be advantageously used in processing the dilute brines into decahydrate crystals.

One unique aspect of this invention is that it crystallizes sodium carbonate decahydrate from relatively dilute solutions containing significant quantities of bicarbonate. This then allows the use of steam stripping as the only required source of bicarbonate decomposition, eliminating the need for expensive neutralizing reagents such as caustic soda or lime.

The process begins by recycling a carbonate containing mother liquor (solvent) to an underground deposit consisting of a bicarbonate containing ore such as trona. As the undersaturated liquor contacts the ore, the solution is enriched in sodium carbonate and sodium bicarbonate. Other soluble impurities such as chlorides, sulfates, silicates, and organic materials may also be dissolved. Typically, insolubles, because of the slow moving nature of the aqueous solvent, are not entrained in the recovered mine brine.

Unfortunately, the dissolution process can become rather complex because of the incongruent solubilities of sodium carbonate and sodium bicarbonate in water. Because carbonate solubility is significantly greater than the bicarbonate solubility, the surface of the mine will gradually become coated with a layer of bicarbonate. This phenomenon has also been described as a redeposition of sodium bicarbonate upon the ore surface. This layer will tend to slow the dissolution process, particularly with respect to carbonate which may become masked by the bicarbonate layer. Therefore, over time, a trona formation mined with water may experience a decline in the carbonate content of the solution mining brine extracted from the mine (the bicarbonate content may actually increase as this occurs).

Phase diagrams known in the literature suggest that eventually the brine grades recovered from a mine operated at 20° C. (68° F.) could fall as low as 7.5% $Na_2CO_3$ and up to 5.9% $NaHCO_3$ if the formation is mined only with water. By returning some carbonate value to the mine, the decline in brine grades can be arrested at some intermediate value. For example, the return of a dissolving brine containing 12% $Na_2CO_3$ and no bicarbonate could, as long as the ore reserves remain, produce a fully saturated solution mining brine containing about 17% $Na_2CO_3$ and about 4.0% $NaHCO_3$. However, this leads to a maximum recoverable total alkalinity (TA) value of 7.52 tons per 100 tons of solution mining liquor, while the case of utilizing pure water as the solvent yields a maximum recoverable TA of 11.2 tons per 100 tons of solution mining liquor. ("TA" is the total alkalinity content of a brine, both carbonate and bicarbonate, expressed as carbonate value.) Surprisingly, this suggests that in a solution mining process being operated in a manner consistent with a long term stable operation, the recoverable alkalinity per gallon of solution mining brine can be greater for dilute brines than for more concentrated brines. The instant invention is a very unique process in that it can economically use very dilute brines and offer the possibility of long term stable operations.

When the solution mining brines are removed from the mine, in accordance with the instant invention, they are stripped with steam to remove $CO_2$ and convert some of the bicarbonate content to carbonate. It should be noted that some of the solution mining brine may be removed from the system prior to steam stripping as a purge stream to remove soluble impurities such as chlorides, sulfates, silicates, and organic compounds. Although this point in the process does not represent the point at which the ratio of impurities to alkalinity is the highest, it still represents an attractive purge point if the purge stream can be sold for other uses such as $SO_2$ scrubbing or for caustic production, where the lower alkalinity of a later purge stream would impose economic penalties. Alternatively, if adequate steam is available, a purge point after the stripping operation could supply liquor to a lime soda caustic producing plant, thereby reducing the consumption of lime.

It should be recognized that the feed to the stripper, and various other process streams, may be pretreated in a number of ways to facilitate downstream processing. Such treatment could include preheating, filtration to remove insoluble material, carbon treating to remove organic contaminants, or the addition of treatment chemicals such as antiscalants or antifoams.

Surprisingly, the decomposition of bicarbonate to carbonate is more easily accomplished by steam stripping using dilute solution mining liquors than with more concentrated solution mining liquors. It has been pointed out in co-pending application Ser. No. 08/489,103 on Jun. 9, 1995 by the instant inventors, that steam stripping works by removing $CO_2$, thus lowering the partial pressure of $CO_2$ above the liquid to below its equilibrium value, which then causes bicarbonate in solution to decompose, forming additional $CO_2$ and carbonate. Therefore, the difference between the equilibrium partial pressure of $CO_2$ and the actual partial pressure of $CO_2$ above a solution provides the driving force for the decomposition of bicarbonate. Higher equilibrium partial pressures thusly favor bicarbonate decomposition. It can be shown that the equilibrium partial pressure of $CO_2$ above a solution containing sodium carbonate and sodium bicarbonate can be related to the carbonate and bicarbonate concentrations by the following expression.

$$P_{CO_2} = \frac{\gamma_{HCO_3^-}^2 [HCO_3^-]^2 K_{a2}}{\gamma_{CO_3^{2-}} [CO_3^{2-}] K_{a1} K_H}$$

From this expression it can be seen that the equilibrium partial pressure of carbon dioxide above a solution containing carbonate and bicarbonate is proportional to the square of the bicarbonate activity and inversely proportional to the carbonate activity. In dilute solution mining brines, the bicarbonate values are elevated, the carbonate values are lower, and the resulting partial pressure of $CO_2$ is higher than in more concentrated solution mining brines. This feature suggests that, contrary to the prevailing belief in the prior art, there are significant advantages to working with dilute solution mining liquors which have relatively low carbonate concentrations. Such a dilute brine with a comparatively higher bicarbonate content has a relatively high equilibrium $CO_2$ partial pressure above the solution; thus as steam strips away this $CO_2$, bicarbonate decomposes to replace the $CO_2$ lost via the stripping action.

The stripped liquors are then sent to a cooling crystallizer, where sodium carbonate decahydrate is crystallized from the solution. Because of the dilute nature of the brines used in the instant invention, the feed brines can contain significant amounts of sodium bicarbonate and a substantially bicarbonate free crystal nevertheless can be produced. The upper limits of bicarbonate which can be tolerated depend upon the carbonate concentration in the feed and the decahydrate operating temperature. The bicarbonate solubility is generally known to be inversely related to the carbonate solubility. These relationships are more fully illustrated by reference to FIG. 1, a solubility phase diagram for the pure sodium carbonate, sodium bicarbonate and water system.

To form a substantially pure sodium carbonate crystal in a decahydrate crystallizer, the feed liquor carbonate and bicarbonate concentrations must be such that the liquor is not in equilibrium with either sodium sesquicarbonate or sodium bicarbonate at any temperature between that of the feed liquor and the temperature of the decahydrate crystallizer. For the pure sodium carbonate, sodium bicarbonate, and water system, the range of concentrations meeting this criteria is given by region A (bound by the solid line formed by connecting points C, D, E, F, and G) in FIG. 1. Liquors outside this range (region B) will first precipitate either sesquicarbonate or bicarbonate (usually in a needle type shape) when introduced to a decahydrate crystallizer. Subsequent formation of sodium carbonate decahydrate crystals apparently form on or around the sesquicarbonate or bicarbonate crystals (nuclei) in a manner that the bulk of the sodium carbonate decahydrate crystals are of an undesirable shape, e.g., needle shape, resulting in poor centrifuge operation and are contaminated, apparently internally, with bicarbonate or sesquicarbonate material. For systems which contain additional impurities, an appropriate phase diagram similar to that constructed in FIG. 1 must be used. Those skilled in the art are familiar with the construction of such phase diagrams.

Figure 1:
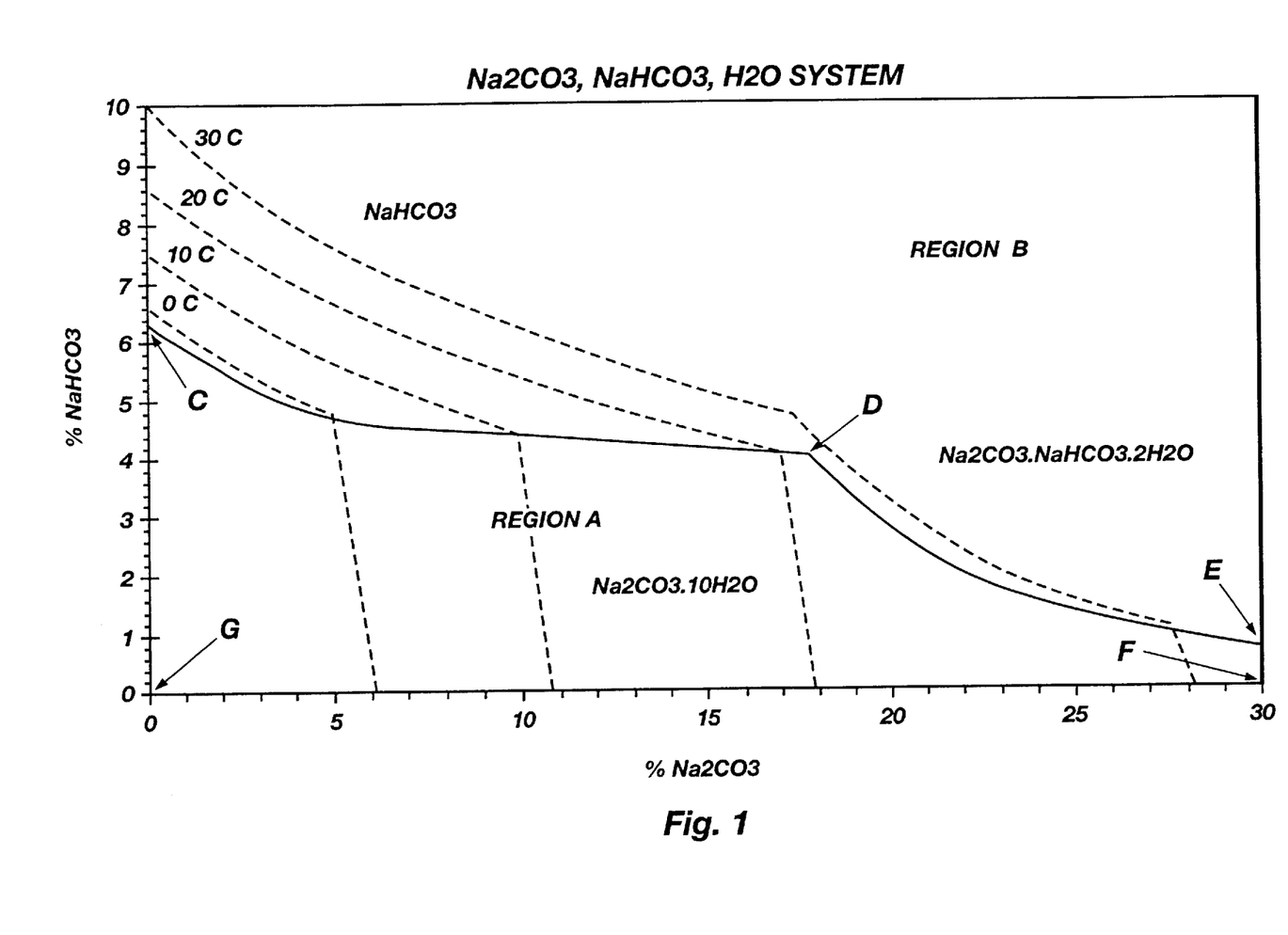

Therefore, the stripper must be operated in a manner to produce liquors within region A. Practical and economic considerations generally result in stripped liquors containing at least 1% sodium bicarbonate, and more often at least 2% sodium bicarbonate. Thus the preferred operating range for decahydrate crystallizer feed streams will be smaller than region A, typically consisting of the portion of region A above a horizontal line corresponding to a bicarbonate concentration of about 1%, or more preferably above about 2% and below about 3%.

For sodium carbonate concentrations in any aqueous solution above about 18%, the maximum sodium bicarbonate solubility concentration decreases rapidly with increasing carbonate values. Therefore, very low bicarbonate values are required in highly concentrated carbonate feed streams. For example, Copenhafer et al. (U.S. Pat. No. 5,283,054) utilizes crystallizer feed streams having a high concentration of carbonate and essentially no bicarbonate.

However, the feed streams used in the present invention are more dilute, generally being less than 24% total alkalinity and preferably less than 20% $Na_2CO_3$, and even more preferably less than 18% $Na_2CO_3$. These solutions can contain significant quantities of bicarbonate and be within region A of FIG. 1. These concentrations serve to further restrict the practical operating area to something smaller than all of region A. However, to be able to produce sodium carbonate decahydrate crystals which are substantially free of bicarbonate contamination, the feed liquors must pass an additional test which even further restricts the range of acceptable feed liquors. This test requires that the bicarbonate content of the feed liquor must be low enough that the mother liquor in the crystallizer will also remain within the desired region A of FIG. 1 during all conditions of operation of the sodium carbonate decahydrate crystallizer. This can be determined by simple heat and material balance calculations familiar to those skilled in the art.

It may be seen by reference to the phase diagram illustrated in FIG. 1, that feed liquors containing more than about 8% sodium carbonate cannot contain more than about 4.5% $NaHCO_3$ without precipitating sodium bicarbonate or sodium sesquicarbonate. However, since ten waters of hydration are removed from such dilute solutions for each sodium carbonate molecule precipitated as decahydrate, the solution becomes more concentrated with respect to sodium bicarbonate as decahydrate is precipitated. Also, evaporation of water to produce cooling within the crystallizer is concurrently taking place, further concentrating the solution with respect to both sodium carbonate and sodium bicarbonate. Therefore, heat and material balances must be performed to ensure the mother liquor in the crystallizer remains within region A designated in FIG. 1. Only feed liquors close to the upper border of the designated region will fail this heat and material balance test. Therefore, in contrast to the prior art, by working with dilute brines, substantial quantities of bicarbonate can be tolerated in the decahydrate crystallizer feed stream of the instant invention. With the need for very low or nonexistent bicarbonate values eliminated, the feed stream can be prepared by steam stripping only without resorting to expensive steps such as caustic addition, or sesquicarbonate crystallization, required in the prior art.

The decahydrate crystallization step represents an expensive part of operating the present invention, although the overall costs of the process of the instant invention are believed to be substantially less than those encountered in the prior art. It is true that more dilute brines require colder decahydrate temperatures to operate properly, and that colder temperatures are more expensive to achieve. Therefore, it is conceivable that in a situation in which an evaporator could be run fairly inexpensively (for example, as an additional effect on an already existing multiple effect evaporator train), some advantages might be realized by performing a limited amount of concentration before the decahydrate crystallization step. This can be accomplished without deviating from the scope of this invention as long as the concentrated brine remains dilute enough to allow substantial quantities (generally greater than 1% and, typically, greater than 2%) of bicarbonate to exist in the crystallizer feed liquor and subsequently avoid precipitation of bicarbonate containing compounds in the decahydrate crystallizer, i.e., operation of the crystallizer so that the feed stream and the resulting mother liquor are in the designated region A in FIG. 1.

The crystals from the decahydrate crystallizer are routed to a solids-liquid separator, e.g., a centrifuge, where they are dewatered, and optionally, washed. The mother liquor is returned to the mine, preferably along with makeup water to serve as the dissolving brine. A portion of the mother liquor prior to make-up water addition may be removed at this point as a purge stream. Depending on the concentration of carbonate and associated impurities, this purge stream may also have commercial uses such as $SO_2$ scrubbing or as a feed stock, or makeup to a feed stock for a caustic soda process.

The sodium carbonate decahydrate crystals can be melted and converted by well known means to various sodium salts including, but not restricted to, soda ash, sodium bicarbonate, sodium sesquicarbonate, and caustic. The monohydrate process as taught by various patents, may be utilized to produce soda ash.

The present invention will be described more fully hereinafter with reference to the accompanying drawings in which a preferred process of the invention is shown. This invention can, however, be practiced in combination with various solution mining processes and ore bodies, including nahcolite in addition to trona, and should not be construed as limited to the process specifically set forth herein. Rather, this process description is provided so that this disclosure will be thorough and complete and will fully convey the scope of the invention to those skilled in the art.

Further description of the invention may be facilitated by reference to the attached drawings.

Figure 2:
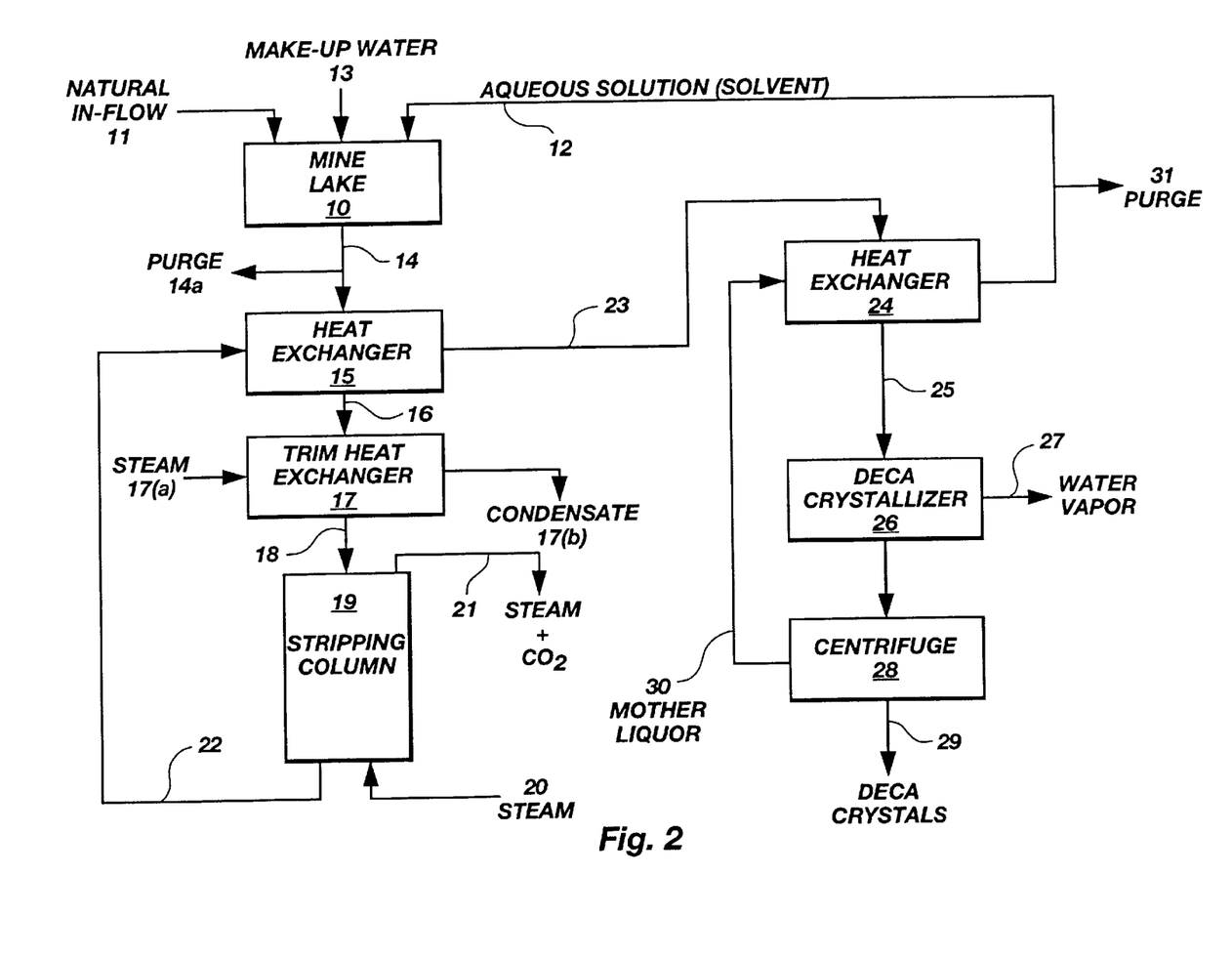
FIG. 2 is a block diagram for carrying out the instant invention in it's preferred form.

A process for producing decahydrate crystals which would then be further processed to form soda ash or other sodium containing salts is illustrated in a simplified process flow sheet, FIG. 2. An underground deposit of trona is solution mined by the formation of a mine lake 10, which is preferably in a cavity which has been previously formed by conventional underground mining techniques, into which natural water may flow from underground streams 11, if present, and into which recycle liquor 12 is directed, as well as make-up water 13, which may be optionally added. Such solution mining may be conducted at temperatures from about 35° F. to about 200° F. with a temperature range of about 60° F. to about 150° F. being typical.

The make-up water 13 may contain some sodium carbonate, some sodium bicarbonate and minor quantities of sodium chloride and sodium sulfate, and in some cases, quantities of caustic, lime, or other alkali if a caustic plant is also operated nearby. Alternatively, the make-up water may be substantially pure water without any salts in it. The recycle liquor stream 12 typically will contain some quantity of sodium carbonate, for example, 4–18%, and sodium bicarbonate, 0–5%, and small quantities of NaCl and/or sodium sulfate. The brine pumped from the lake will generally have a temperature of about 65–200° F. with a sodium carbonate composition typically of about 7% to about 18%, sodium bicarbonate content of about 3–12% and NaCl and sodium sulfate concentrations of from about 0 to about 10%.

Some of the brine 14 pumped from the mine may be purged through stream 14(*a*) and be used for other purposes. For example, because of the carbonate content of the brine, even though the total alkalinity is not concentrated, the brine can serve as an effective liquid for scrubbing $SO_2$ from power station exhaust gases. It may also serve as the feed for a lime soda caustic plant.

Although the dilute brine 14 may be fed directly to a stripping column without preheating it is generally preferred that such brine stream be preheated, especially if heat energy can be recuperated. The brine stream 14 is directed to a heat exchanger 15 whereby the temperature may be increased to near that of the stripping column. Heated stream 16 having the same chemical composition as stream 14 may then be directed into a trim heat exchanger 17 which is heated with steam 17(a) whereby condensate 17(b) is directed away from the exchanger. Trim heat exchanger 17 is used to finish heating the feed stream 18 to the stripping column 19 to a temperature approximately equal to that in the stripping column so that flashing and condensation may be avoided in the column.

Hot brine stream 18 is fed to the top of a stripping column 19 which has steam 20 directed into the bottom of the column. The stripping column is operated at about 150° F. to about 350° F. and is typically filled with appropriate packing to present an extended interface area between the liquid and the gas (steam). The stripping column converts sodium bicarbonate to sodium carbonate by stripping off $CO_2$. Steam and $CO_2$ exit through exhaust line 21. Decomposition of the bicarbonate produces carbonate and water; thus, no overall loss of water occurs during stripping, i.e., total alkalinity concentration stays the same. The steam in line 21 is preferably used for heating elsewhere in the plant (for example, in a monohydrate crystallizer). A preferred operating temperature for the stripper is about 210° F. to about 270° F.

The chemical composition of stream 22 exiting the bottom of the stripper is: sodium carbonate, up to about 24% although preferably about 9% to about 18%; sodium bicarbonate from about 1% to about 4.5% although preferably about two to three percent, although if an exceptionally large stripping column is used, the stripping column may be operated to produce substantially zero percent sodium bicarbonate. Additionally, stream 22 may contain sodium chloride and/or sodium sulfate in small amounts up to about 10%. A portion of the stripped brine may be purged and diverted for other uses, such as the feed to a lime soda caustic plant.

The stripped brine solution having enhanced sodium carbonate content is then directed through heat exchanger 15 to heat up the incoming brine stream 14 being pumped from the mine lake. This type of energy recuperation assists in making the total process more economic. The enriched brine stream 23 is then much cooler, usually a little above the mine water temperature. It may be fed through another energy recuperating device 24 as cooled stream 25 which is the feed stream to a decahydrate crystallizer 26.

The decahydrate crystallizer is typically operated at a temperature below about 20° C. (68° F.). Water may be evaporated in the crystallizer to cool the solution although other forms of refrigeration are acceptable. Evaporation is most often accomplished at cool temperatures by boiling under vacuum using barometric condensers or steam jet refrigeration, well known techniques to those skilled in the art, to remove a water vapor stream 27. Up to about 10% of the water present in the crystallizer may be lost through evaporation.

A slurry of decahydrate crystals and mother liquor departs the crystallizer and is introduced into a centrifuge 28 or other solid-liquid separation device. Decahydrate crystals, stream 29, with about 4% by weight mother liquor wetting the crystals are discharged from the centrifuge. Optionally, the crystals could be washed with cold water at this stage to further lower impurities. The mother liquor exits the centrifuge as stream 30 and has a composition of about 4–18% by weight sodium carbonate, about 1–4.5% sodium bicarbonate, although typically, about 3 to 4.5% sodium bicarbonate and small quantities of salt and/or sodium sulfate, for example, about 0–15% of each. The mother liquor in stream 30 may be warmed via heat exchanger 24 and recycled as stream 12 to the underground deposit, that is, the mine lake 10. Also a small amount of stream 30 may be purged, stream 31, thus the stream flow 12 may not be equal to stream flow 30. Stream 30 may be advantageously used as the feed stream to a caustic production process.

It has been found in the above process that the decahydrate crystallizer works quite effectively with dilute solutions in the presence of significant quantities of bicarbonate, for example, from about 2–4% and even up to about 4.5%. Carbonate concentrations in the feed are generally less than about 18% although they may be as high as 24% provided that the feed stream contains about 1% to 1½% bicarbonate. Higher carbonate concentrations are generally not useful because of the difficulty in reducing the bicarbonate to sufficiently low values with just steam stripping. The crystallizer works quite well with carbonate concentrations in the feed of about 17–18% or even lower, especially since such lower carbonate concentrations permit higher bicarbonate concentrations without contaminant crystals being formed in the decahydrate crystallizer.

Generally as carbonate concentrations increase, the solubility of bicarbonate in a mixed carbonate/bicarbonate solution decreases. Thus, in concentrated carbonate solutions the presence of any bicarbonate presents difficulty in obtaining pure carbonate crystals in a decahydrate crystallizer. It has been found that if bicarbonate or sesquicarbonate precipitates before or during crystallization of sodium carbonate decahydrate crystals that the structure of the carbonate crystal is not particularly desirable. The bicarbonate or sesquicarbonate crystals may be needle-shaped and, when decahydrate crystals subsequently crystallize, they appear to employ the bicarbonate or sesquicarbonate crystals as nuclei and take on generally the detrimental shape of the nuclei.

Although it is generally contrary to conventional crystallizing techniques, it is actually preferred in the instant process to use dilute solutions of sodium carbonate rather than concentrated solutions. While extra volumes of water may need to be handled, the avoidance of evaporating large quantities of water to give concentrated solutions has energy advantages and the use of a stripping step alone to reduce bicarbonate to acceptable levels is unique and advantageous. In recently described existing processes such as of the Copenhafer patent, caustic must be used to convert essentially all of the bicarbonate to carbonate before decahydrate crystallization can be conducted on a solution mine brine. Caustic is an expensive reagent even when it is produced from sodium carbonate and lime. Process advantages are achieved by avoiding the use of caustic either before or after the stripping step and prior to crystallization of the decahydrate crystals.

The process of the instant invention produces a bulk decahydrate crystal product which has the composition of about 33 to 37% sodium carbonate, about zero to about 0.3% sodium bicarbonate and typically about zero to about 0.05% sodium chloride and about zero to about 0.4% sodium sulfate. Most of the remainder is water. The decahydrate crystals may be melted and directed to a sodium carbonate monohydrate processing plant wherein monohydrate crystals are formed by evaporating water. The monohydrate crystals may be dried to produce soda ash. The steam used and/or produced in the monohydrate process may be advantageously employed as the steam stream 20, fed to stripper 19. Steam stream 21, although containing $CO_2$, may then be used to heat the monohydrate crystallizers. Other processes using large quantities of steam, such as found in caustic evaporation trains, may be used to provide the steam represented by stream 20.

The following tables provide a material balance for the previously described preferred process. Table 1 shows the process as it would work using the brine which is likely to be found early in the life of a solution mining project, i.e., an unblinded deposit. This brine is similar to the brine exemplified in recent patents (Copenhafer and Frint). Table 2 shows the material balance for a mine which is fully "blinded", and is dissolving ore congruently. This table is included so that the utility of the instant invention in long term solution mining of trona ore is evident. The numerals (ID#) identifying various streams are those shown on the process flow diagram, FIG. 2. The designation (tph) means "tons per hour."

TABLE 1

| Stream | ID # | tph | Temp ° F. | $Na_2CO_3$ tph | wt % | $NaHCO_3$ tph | wt % | NaCl tph | wt % | $Na_2SO_4$ tph | wt % | $H_2O$ tph | wt % |
|---|---|---|---|---|---|---|---|---|---|---|---|---|---|
| Feed Brine | 14 | 498 | 68 | 71.7 | 14.4 | 20.9 | 4.2 | 3.0 | 0.6 | 2.0 | 0.4 | 400 | 80.4 |
| Saleable Purge | 14 (a) | 24 | 68 | 3.4 | 14.4 | 1.0 | 4.2 | 0.1 | 0.6 | 0.1 | 0.4 | 19 | 80.4 |
| Stripper Exit Vapor | 21 | 137 | 240 | | | | | | | | | 135 | 98.3 |
| Stripped Liquor | 22 | 472 | 240 | 74.6 | 15.8 | 10.0 | 2.1 | 2.8 | 0.6 | 1.9 | 0.4 | 383 | 81.1 |
| Deca Mother Liquor | 30 | 287 | 35 | 16.6 | 5.8 | 9.8 | 3.4 | 2.7 | 0.9 | 1.7 | 0.6 | 256 | 89.3 |
| Deca Crystals | 29 | 162 | 35 | 58.0 | 35.8 | 0.2 | 0.1 | 0.1 | 0.0 | 0.2 | 0.1 | 104 | 64.0 |
| Purge | 31 | 30 | 35 | 1.7 | 5.8 | 1.0 | 3.4 | 0.3 | 0.9 | 0.2 | 0.5 | 27 | 89.1 |

TABLE 2

| Stream | ID # | tph | Temp ° F. | $Na_2CO_3$ tph | wt % | $NaHCO_3$ tph | wt % | NaCl tph | wt % | $Na_2SO_4$ tph | wt % | $H_2O$ tph | wt % |
|---|---|---|---|---|---|---|---|---|---|---|---|---|---|
| Feed Brine | 14 | 1178 | 68 | 99.2 | 8.4 | 62.0 | 5.3 | 9.4 | 0.8 | 5.0 | 0.4 | 1002 | 85.1 |
| Saleable Purge | 14 (a) | 23 | 68 | 1.9 | 8.4 | 1.2 | 5.3 | 0.2 | 0.8 | 0.1 | 0.4 | 20 | 85.1 |
| Stripper Exit Vapor | 21 | 142 | 240 | | | | | | | | | 135 | 94.9 |
| Stripped Liquor | 22 | 1148 | 240 | 116.5 | 10.1 | 30.4 | 2.7 | 9.2 | 0.8 | 4.9 | 0.4 | 987 | 86.0 |
| Deca Mother Liquor | 30 | 962 | 35 | 59.6 | 6.2 | 30.2 | 3.1 | 9.0 | 0.9 | 4.7 | 0.5 | 859 | 89.3 |
| Deca Crystals | 29 | 159 | 35 | 56.9 | 35.8 | 0.2 | 0.1 | 0.1 | 0.0 | 0.2 | 0.1 | 102 | 64.0 |
| Purge | 31 | 23 | 35 | 1.4 | 6.2 | 0.7 | 3.1 | 0.2 | 0.9 | 0.1 | 0.5 | 21 | 89.5 |

It is notable from the data of the Tables that the stripped liquor, stream 22, and the Deca Mother Liquor, stream 30, in each instance, i.e., Table 1 and Table 2, have a composition which falls within a preferred range of Region A (FIG. 1).

The temperatures set forth in the above tables are illustrative of suitable temperatures although other temperatures falling within the temperature ranges set forth elsewhere herein may be advantageously utilized in the practice of the invention. Operation of the deca crystallizer is shown at a temperature of 35° F. (about 2° C.) and is preferably at a temperature of less than about 45° F. although higher temperatures may be used, e.g., up to about 68° F. Also, the various compositions shown in the tables may be varied within the parameters described elsewhere without deviating from the invention.

Although various embodiments of the invention have been described herein, the scope of the invention is not intended to be limited thereby but is defined by the appended claims.

What is claimed is:

1. A method of producing sodium carbonate decahydrate from liquors containing sodium bicarbonate derived from the dissolution in situ of underground bicarbonate containing ore deposits consisting essentially of:

a) contacting said bicarbonate containing ore with an aqueous solution containing sodium carbonate to produce a sodium bicarbonate enriched feed brine in which the sodium carbonate and sodium bicarbonate content is such that cooling of such sodium bicarbonate enriched feed brine to precipitate crystals in subsequent steps would result in formation of sodium bicarbonate or sodium sesquicarbonate crystals instead of or in addition to sodium carbonate decahydrate crystals, said sodium bicarbonate enriched feed brine having a total alkalinity of less than about 20% and a sodium carbonate concentration of greater than about 7%;

b) steam stripping said sodium bicarbonate enriched feed brine with external steam above about 210° F. to convert at least a portion of the sodium bicarbonate in said sodium bicarbonate enriched feed brine to sodium carbonate to produce a sodium carbonate enriched brine of such a composition that will not precipitate sodium sesquicarbonate or sodium bicarbonate in a subsequent cooling crystallization step and has a total alkalinity substantially the same as said sodium bicarbonate enriched feed brine;

c) cooling said sodium carbonate enriched brine to precipitate sodium carbonate decahydrate crystals containing no more than minimal amounts of sodium bicarbonate values and yielding a slurry of said sodium carbonate decahydrate crystals in a mother liquor;

d) separating said sodium carbonate decahydrate crystals from said mother liquor; and e) returning at least a portion of said mother liquor to said underground ore deposit.

2. The process of claim 1, wherein said steam stripping produces a brine containing at least 1% sodium bicarbonate.

3. The process of claim 1, wherein said steam stripping produces a brine containing more than about 1½% sodium bicarbonate.

4. The process of claim 1, wherein said steam stripping produces a brine containing at least about 2% sodium bicarbonate.

5. The process of claim 1, wherein a portion of said sodium carbonate enriched brine is used to produce caustic soda.

6. The process of claim 1, wherein a portion of said sodium bicarbonate enriched brine is purged to control impurity levels in the system.

7. The process of claim 1, wherein a portion of said sodium carbonate enriched brine is purged to control impurity levels in the system.

8. The process of claim 1, wherein a portion of said mother liquor is purged to control impurity levels.

9. A method of producing sodium carbonate decahydrate from liquors containing sodium bicarbonate derived from the dissolution in situ of underground bicarbonate containing ore deposits consisting essentially of:

a) contacting said bicarbonate containing ore with an aqueous solution containing sodium carbonate to produce a sodium bicarbonate enriched feed brine in which the sodium carbonate and sodium bicarbonate content is such that evaporating and cooling of such sodium bicarbonate enriched feed brine to precipitate crystals in subsequent steps would result in formation of sodium bicarbonate or sodium sesquicarbonate crystals instead of or in addition to sodium carbonate decahydrate crystals;

b) evaporating and steam stripping above about 210° F. said sodium bicarbonate enriched feed brine to convert at least a portion of the sodium bicarbonate in said sodium bicarbonate enriched feed brine to sodium carbonate to produce a sodium carbonate enriched brine having a total alkalinity of less than about 24% and a sodium bicarbonate content of greater than about 1% and which will not precipitate sodium sesquicarbonate or sodium bicarbonate in a subsequent cooling crystallization step;

c) cooling said sodium carbonate enriched brine to precipitate sodium carbonate decahydrate crystals containing no more than minimal amounts of sodium bicarbonate values and yielding a slurry of said sodium carbonate decahydrate crystals in a mother liquor;

d) separating said sodium carbonate decahydrate crystals from said mother liquor; and e) returning at least a portion of said mother liquor to said underground ore deposit.

10. The process of claim 9, wherein said steam stripping is performed between about 210° F. and about 270° F.

11. The process of claim 9, wherein said steam stripping produces a brine containing more than about 1½% sodium bicarbonate.

12. The process of claim 9, wherein said steam stripping produces a brine containing at least about 2% sodium bicarbonate.

13. The process of claim 9, wherein a portion of said mother liquor is purged to control impurity levels.

14. The process of claim 9, wherein a portion of said sodium carbonate enriched brine is used to produce caustic soda.

15. The process of claim 9, wherein a portion of said sodium bicarbonate enriched brine is purged to control impurity levels in the system.

16. The process of claim 9, wherein a portion of said sodium carbonate enriched brine is purged to control impurity levels in the system.

17. A method of producing sodium carbonate decahydrate from liquors containing sodium bicarbonate derived from the dissolution in situ of underground bicarbonate containing ore deposits consisting essentially of:

a) contacting said bicarbonate containing ore with an aqueous solution containing sodium carbonate to produce a sodium bicarbonate enriched feed brine in which the sodium carbonate and sodium bicarbonate content is such that cooling of such sodium bicarbonate enriched feed brine to precipitate crystals in subsequent steps would result in the formation of sodium bicarbonate or sodium sesquicarbonate crystals instead of or in addition to sodium carbonate decahydrate crystals, said sodium bicarbonate enriched feed brine having a total alkalinity of less than about 20% and a sodium carbonate content of greater than about 7%;

b) steam stripping said sodium bicarbonate enriched feed brine with external steam above about 210° F. and adding caustic to convert at least a portion of the sodium bicarbonate in said sodium bicarbonate enriched feed brine to sodium carbonate to produce a sodium carbonate enriched brine of such a composition that will not precipitate sodium sesquicarbonate or sodium bicarbonate in a subsequent cooling crystallization step and has a total alkalinity substantially the same as said sodium bicarbonate enriched feed brine;

c) cooling said sodium carbonate enriched brine to precipitate sodium carbonate decahydrate crystals containing no more than minimal amounts of sodium bicarbonate values and yielding a slurry of said sodium carbonate decahydrate crystals in a mother liquor;

d) separating said sodium carbonate decahydrate crystals from said mother liquor; and e) returning at least a portion of said mother liquor to said underground ore deposit.

18. The process of claim 17, wherein said cooling of sodium carbonate enriched brine comprises cooling said sodium carbonate enriched brine to below about 20° C. (68° F.).

19. The process of claim 17, wherein said cooling of sodium carbonate enriched brine comprises cooling said sodium carbonate enriched brine to below about 20° C. (68° F.).

20. The process of claim 17, wherein said steam stripping is performed between about 210° F. and about 270° F.

21. The process of claim 17, wherein said steam stripping produces a brine containing at least 1% sodium bicarbonate.

22. The process of claim 17, wherein said steam stripping produces a brine containing more than about 1½% sodium bicarbonate.

23. The process of claim 17, wherein said steam stripping produces a brine containing at least about 2% sodium bicarbonate.

24. The process of claim 17, wherein said cooling of sodium carbonate enriched brine comprises cooling said sodium carbonate enriched brine to below about 20° C. (68° F.).

25. The process of claim 17, wherein a portion of said sodium carbonate enriched brine is used to produce caustic soda.

26. The process of claim 17, wherein a portion of said sodium bicarbonate enriched brine is purged to control impurity levels in the system.

27. The process of claim 17, wherein a portion of said sodium carbonate enriched brine is purged to control impurity levels in the system.

28. The process of claim 17, wherein a portion of said mother liquor is purged to control impurity levels.

29. A method of producing sodium carbonate decahydrate from liquors containing sodium bicarbonate derived from the dissolution in situ of underground bicarbonate containing ore deposits consisting essentially of:
   a) contacting said bicarbonate containing ore with an aqueous solution containing sodium carbonate to produce a sodium bicarbonate enriched feed brine in which the sodium carbonate content is less than 20%, and wherein the sodium carbonate and the sodium bicarbonate content is such that evaporating and cooling of such sodium bicarbonate enriched feed brine to precipitate crystals in subsequent steps would result in the formation of sodium bicarbonate or sodium sesquicarbonate crystals instead of or in addition to sodium carbonate decahydrate crystals;
   b) evaporating, steam stripping above about 210° F., and adding caustic to said sodium bicarbonate enriched feed brine to convert at least a portion of the sodium bicarbonate in said sodium bicarbonate enriched feed brine to sodium carbonate to produce a sodium carbonate enriched brine containing less than 20% sodium carbonate and which is of such a composition that will not precipitate sodium sesquicarbonate or sodium bicarbonate in a subsequent cooling crystallization step;
   c) cooling said sodium carbonate enriched brine to precipitate sodium carbonate decahydrate crystals containing no more than minimal amounts of sodium bicarbonate values and yielding a slurry of said sodium carbonate decahydrate crystals in a mother liquor;
   d) separating said sodium carbonate decahydrate crystals from said mother liquor; and
   e) retaining at least a portion of said mother liquor to said underground ore deposit.

30. The process of claim 29, wherein said steam stripping is performed between about 210° F. and about 270° F.

31. The process of claim 29, wherein said steam stripping produces a brine containing at least 1% sodium bicarbonate.

32. The process of claim 29, wherein said steam stripping produces a brine containing more than about 1½% sodium bicarbonate.

33. The process of claim 29, wherein said steam stripping produces a brine containing at least about 2% sodium bicarbonate.

34. The process of claim 29, wherein said cooling of sodium carbonate enriched brine comprises cooling said sodium carbonate enriched brine to below about 20° C. (68° F.).

35. The process of claim 29, wherein a portion of said sodium carbonate enriched brine is used to produce caustic soda.

36. The process of claim 29, wherein a portion of said sodium bicarbonate enriched brine is purged to control impurity levels in the system.

37. The process of claim 29, wherein a portion of said sodium carbonate enriched brine is purged to control impurity levels in the system.

38. The process of claim 29, wherein a portion of said mother liquor is purged to control impurity levels.

39. A method of producing sodium carbonate decahydrate from liquors containing sodium bicarbonate derived from the dissolution in situ of underground bicarbonate containing ore deposits consisting essentially of:
   a) contacting said bicarbonate containing ore with an aqueous solution containing sodium carbonate to produce a sodium bicarbonate enriched feed brine in which the sodium carbonate and sodium bicarbonate content is such that evaporating and cooling of such sodium bicarbonate enriched feed brine to precipitate crystals in subsequent steps would result in the formation of sodium bicarbonate or sodium sesquicarbonate crystals instead of or in addition to sodium carbonate decahydrate crystals;
   b) evaporating, steam stripping above about 210° F., and adding caustic to said sodium bicarbonate enriched feed brine to convert at least a portion of the sodium bicarbonate in said sodium bicarbonate enriched feed brine to sodium carbonate to produce a sodium carbonate enriched brine containing less than about 24% total alkalinity and having a sodium bicarbonate concentration greater than about 1% and which is of such a composition that will not precipitate sodium sesquicarbonate or sodium bicarbonate in a subsequent cooling crystallization step;
   c) cooling said sodium carbonate enriched brine to precipitate sodium carbonate decahydrate crystals containing no more than minimal amounts of sodium bicarbonate values and yielding a slurry of said sodium carbonate decahydrate crystals in a mother liquor;
   d) separating said sodium carbonate decahydrate crystals from said mother liquor; and
   e) returning at least a portion of said mother liquor to said underground ore deposit.

40. The process of claim 39, wherein said steam stripping is performed between about 210° F. and about 270° F.

41. The process of claim 39, wherein said steam stripping produces a brine containing more than about 1½% sodium bicarbonate.

42. The process of claim 39, wherein said steam stripping produces a brine containing at least about 2% sodium bicarbonate.

43. The process of claim 39, wherein said cooling of sodium carbonate enriched brine comprises cooling said sodium carbonate enriched brine to below about 20° C. (68° F.).

44. The process of claim 39, wherein a portion of said sodium carbonate enriched brine is used to produce caustic soda.

45. The process of claim 39, wherein a portion of said sodium bicarbonate enriched brine is purged to control impurity levels in the system.

46. The process of claim 39, wherein a portion of said sodium carbonate enriched brine is purged to control impurity levels in the system.

47. The process of claim 39, wherein a portion of said mother liquor is purged to control impurity levels.

48. A method of producing sodium carbonate decahydrate from liquors containing sodium bicarbonate derived from the dissolution in situ of underground bicarbonate containing ore deposits comprising:
   a) contacting said bicarbonate containing ore with an aqueous solution containing sodium carbonate to produce a sodium bicarbonate enriched feed brine in which the sodium carbonate and sodium bicarbonate content is such that cooling of such enriched feed brine to precipitate crystals in subsequent steps would result in the formation of sodium bicarbonate or sodium sesquicarbonate crystals instead of or in addition to sodium carbonate decahydrate crystals;

b) steam stripping said feed brine above about 210° F. to convert at least a portion of the sodium bicarbonate in said feed brine to sodium carbonate to produce a sodium carbonate enriched brine of such a composition that: i) sodium carbonate decahydrate will precipitate in a subsequent cooling crystallization step, and ii) sodium sesquicarbonate or sodium bicarbonate will not precipitate in a subsequent cooling crystallization step, said brine constituting a crystallization step feed brine;

c) cooling a crystallization step feed brine containing more than about 1% sodium bicarbonate to precipitate sodium carbonate decahydrate crystals containing no more than minimal amounts of sodium bicarbonate values and yielding a slurry of said crystals in a mother liquor;

d) separating said sodium carbonate decahydrate crystals from said mother liquor; and e) returning at least a portion of said mother liquor to said underground ore deposit.

49. The method of claim 48, wherein said steam stripping is performed between about 210° F. and about 270° F.

50. The method of claim 48, wherein the bicarbonate containing ore is trona.

51. A method of producing sodium carbonate decahydrate from liquors containing sodium bicarbonate derived from the dissolution in situ of underground bicarbonate containing ore deposits comprising:

a) contacting said bicarbonate containing ore with an aqueous solution containing sodium carbonate to produce a sodium bicarbonate enriched feed brine in which the sodium carbonate and sodium bicarbonate content is such that cooling of such enriched feed brine to precipitate crystals in subsequent steps would result in the formation of sodium bicarbonate or sodium sesquicarbonate crystals instead of or in addition to sodium carbonate decahydrate crystals;

b) steam stripping said feed brine above about 210° F. to convert at least a portion of the sodium bicarbonate in said feed brine to sodium carbonate to produce a sodium carbonate enriched brine of such a composition that: i) sodium carbonate decahydrate will precipitate in a subsequent cooling crystallization step, and ii) sodium sesquicarbonate or sodium bicarbonate will not precipitate in a subsequent cooling crystallization step, said brine constituting a crystallization step feed brine;

c) cooling a crystallization step feed brine containing less than about 20% sodium carbonate to precipitate sodium carbonate decahydrate crystals containing no more than minimal amounts of sodium bicarbonate values and yielding a slurry of said crystals in a mother liquor;

d) separating said sodium carbonate decahydrate crystals from said mother liquor; and e) returning at least a portion of said mother liquor to said underground ore deposit.

52. The method of claim 51, wherein the sodium bicarbonate enriched brine contains more than about 3% sodium bicarbonate by weight.

53. The method of claim 51, wherein the sodium bicarbonate enriched brine contains between about 7% and about 18% sodium carbonate by weight.

54. A method of producing sodium carbonate decahydrate from liquors containing sodium bicarbonate derived from the dissolution in situ of underground bicarbonate containing ore deposits comprising:

a) contacting said bicarbonate containing ore with an aqueous solution containing sodium carbonate to produce a sodium bicarbonate enriched feed brine in which the sodium carbonate and sodium bicarbonate content is such that cooling of such enriched feed brine to precipitate crystals in subsequent steps would result in the formation of sodium bicarbonate or sodium sesquicarbonate crystals instead of or in addition to sodium carbonate decahydrate crystals;

b) steam stripping said feed brine above about 210° F. to convert at least a portion of the sodium bicarbonate in said feed brine to sodium carbonate to produce a sodium carbonate enriched brine of such a composition that: i) sodium carbonate decahydrate will precipitate in a subsequent cooling crystallization step, and ii) sodium sesquicarbonate or sodium bicarbonate will not precipitate in a subsequent cooling crystallization step, said brine constituting a crystallization step feed brine;

c) cooling a crystallization step feed brine containing more than about 1% sodium bicarbonate and less than about 20% sodium carbonate to precipitate sodium carbonate decahydrate crystals containing no more than minimal amounts of sodium bicarbonate values and yielding a slurry of said crystals in a mother liquor;

d) separating said sodium carbonate decahydrate crystals from said mother liquor; and e) returning at least a portion of said mother liquor to said underground ore deposit.

55. The method of claim 54, wherein a portion of said sodium carbonate enriched brine is used to produce caustic soda.

56. A method of producing sodium carbonate decahydrate from liquors containing sodium bicarbonate derived from the dissolution in situ of underground bicarbonate containing ore deposits comprising:

a) contacting said bicarbonate containing ore with an aqueous solution containing sodium carbonate to produce a sodium bicarbonate enriched feed brine in which the sodium carbonate and sodium bicarbonate content is such that cooling of such enriched feed brine to precipitate crystals in subsequent steps would result in the formation of sodium bicarbonate or sodium sesquicarbonate crystals instead of or in addition to sodium carbonate decahydrate crystals;

b) steam stripping said feed brine above about 210° F. to convert at least a portion of the sodium bicarbonate in said feed brine to sodium carbonate to produce a sodium carbonate enriched brine of such a composition that: i) sodium carbonate decahydrate will precipitate in a subsequent cooling crystallization step, and ii) sodium sesquicarbonate or sodium bicarbonate will not precipitate in a subsequent cooling crystallization step, said brine constituting a crystallization step feed brine;

c) cooling a crystallization step feed brine containing more than about 1% sodium bicarbonate and less than about 24% total alkalinity to precipitate sodium carbonate decahydrate crystals containing no more than minimal amounts of sodium bicarbonate values and yielding a slurry of said crystals in a mother liquor;

d) separating said sodium carbonate decahydrate crystals from said mother liquor; and
e) returning at least a portion of said mother liquor to said underground ore deposit.

57. The method of claim 56, wherein a portion of said sodium bicarbonate enriched brine is purged to control impurity levels in the system.

58. The method of claim 56, wherein a portion of said sodium carbonate enriched brine is purged to control impurity levels in the system.

59. A method of producing sodium carbonate decahydrate from liquors containing sodium bicarbonate derived from the dissolution in situ of underground bicarbonate containing ore deposits comprising:
   a) contacting said bicarbonate containing ore with an aqueous solution containing sodium carbonate to produce a sodium bicarbonate enriched feed brine;
   b) steam stripping said feed brine above about 210° F. to convert at least a portion of the sodium bicarbonate in said feed brine to sodium carbonate to produce a crystallization step feed brine;
   c) cooling a crystallization step feed brine having a composition within region A of FIG. 1 and containing less than about 20% sodium carbonate to precipitate sodium carbonate decahydrate crystals containing no more than minimal amounts of sodium bicarbonate values and yielding a slurry of said crystals in a mother liquor with a composition within region A of FIG. 1;
   d) separating said sodium carbonate decahydrate crystals from said mother liquor; and
   e) returning at least a portion of said mother liquor to said underground ore deposit.

60. The method of claim 59, wherein the sodium bicarbonate enriched brine has a total alkalinity between about 11% and about 20%.

61. A method of producing sodium carbonate decahydrate from liquors containing sodium bicarbonate derived from the dissolution in situ of underground bicarbonate containing ore deposits comprising:
   a) contacting said bicarbonate containing ore with an aqueous solution containing sodium carbonate to produce a sodium bicarbonate enriched feed brine;
   b) steam stripping said feed brine above about 210° F. to convert at least a portion of the sodium bicarbonate in said feed brine to sodium carbonate to produce a crystallization step feed brine;
   c) cooling a crystallation step feed brine having a composition with region A of FIG. 1 and containing more than about 1% sodium bicarbonate and less than about 20% sodium carbonate to precipitate sodium carbonate decahydrate crystals containing no more than minimal amounts of sodium bicarbonate values and yielding a slurry of said crystals in a mother liquor with a composition within region A of FIG. 1;
   d) separating said sodium carbonate decahydrate crystals from said mother liquor; and
   e) returning at least a portion of said mother liquor to said underground ore deposit.

62. The method of claim 61, wherein a portion of said mother liquor is purged to control impurity levels.

63. A method of producing sodium carbonate decahydrate from liquors containing sodium bicarbonate derived from the dissolution in situ of underground bicarbonate containing ore deposits comprising:
   a) contacting said bicarbonate containing ore with an aqueous solution containing sodium carbonate to produce a sodium bicarbonate enriched feed brine;
   b) steam stripping said feed brine above about 210° F. to convert at least a portion of the sodium bicarbonate in said feed brine to sodium carbonate to produce a crystallization step feed brine;
   c) cooling a crystallization step feed brine with a composition within region A of FIG. 1 and containing more than about 1% sodium bicarbonate and less than about 24% total alkalinity to precipitate sodium carbonate decahydrate crystals containing no more than minimal amounts of sodium bicarbonate values and yielding a slurry of said crystals in a mother liquor with a composition within region A of FIG. 1;
   d) separating said sodium carbonate decahydrate crystals from said mother liquor; and
   e) returning at least a portion of said mother liquor to said underground ore deposit.

64. The method of claim 63, wherein the mother liquor has a sodium bicarbonate concentration between about 3% and about 4.5%.

65. A method of producing sodium carbonate decahydrate from liquors containing sodium bicarbonate derived from the dissolution in situ of underground bicarbonate containing ore deposits comprising:
   a) contacting said bicarbonate containing ore with an aqueous solution containing sodium carbonate to produce a sodium bicarbonate enriched feed brine;
   b) steam stripping said feed brine above about 210° F. to convert at least a portion of the sodium bicarbonate in said feed brine to sodium carbonate to produce a crystallization step feed brine;
   c) cooling a crystallization step feed brine having a composition within region A of FIG. 1 and containing more than about 1% sodium bicarbonate to precipitate sodium carbonate decahydrate crystals containing no more than minimal amounts of sodium bicarbonate values and yielding a slurry of said crystals in a mother liquor with a composition within region A of FIG. 1;
   d) separating said sodium carbonate decahydrate crystals from said mother liquor; and
   e) returning at least a portion of said mother liquor to said underground ore deposit.

66. The method of claim 65, wherein said cooling a crystallization step feed brine further comprises cooling said crystallization step feed brine to below about 20° C. (68° F.).

67. A method of producing sodium carbonate decahydrate from liquors containing sodium bicarbonate derived from the dissolution in situ of underground bicarbonate containing ore deposits comprising:
   a) contacting said bicarbonate containing ore with an aqueous solution containing sodium carbonate to produce a sodium bicarbonate enriched feed brine in which the sodium carbonate and sodium bicarbonate content is such that cooling of such enriched feed brine to precipitate crystals in subsequent steps would result in the formation of sodium bicarbonate or sodium sesquicarbonate crystals instead of or in addition to sodium carbonate decahydrate crystals;
   b) steam stripping said feed brine above about 210° F. to convert at least a portion of the sodium bicarbonate in said feed brine to sodium carbonate to produce a crystallization step feed brine of such a composition that: i) sodium carbonate decahydrate will precipitate in a subsequent cooling crystallization step, and ii) sodium sesquicarbonate or sodium bicarbonate will not precipitate in a subsequent cooling crystallization step, said brine constituting a crystallization step feed brine;

c) cooling said crystallization step feed brine containing more than about 1% sodium bicarbonate to precipitate sodium carbonate decahydrate crystals containing no more than minimal amounts of sodium bicarbonate values and yielding a slurry of said crystals in another liquor;

d) separating said sodium carbonate decahydrate crystals from said mother liquor; and e) retaining at least a portion of said mother liquor to said underground ore deposit.

* * * * *